United States Patent [19]

Magorian

[11] 4,338,603
[45] Jul. 6, 1982

[54] SELF ADAPTIVE CORRELATION RADAR
[75] Inventor: William R. Magorian, Rialto, Calif.
[73] Assignee: The United States of America as represented by the Secretary of the Navy, Washington, D.C.
[21] Appl. No.: 643,297
[22] Filed: May 25, 1967
[51] Int. Cl.³ .................................................. G01S 7/28
[52] U.S. Cl. ........................ 343/17.1 R; 343/100 CL
[58] Field of Search .............. 343/17.1, 100.7, 100 CL
[56] References Cited
U.S. PATENT DOCUMENTS
3,208,065 9/1965 Gutleber et al. ................ 343/17.1 R Primary Examiner—Malcolm F. Hubler
Attorney, Agent, or Firm—Robert F. Beers; J. M. St. Amand; T. M. Phillips

[57] ABSTRACT

A coherent radar system for using the effects of doppler shift on the distributed spectrum of a pulse modulated carrier to produce a harmonic relationship between doppler side bands at the frequency of the transmitted pulse repetition frequency. Correlation between adjacent side bands are used to generate a second order doppler signal which has a wavelength equal to the pulse repetition frequency instead of the carrier frequency.

2 Claims, 2 Drawing Figures

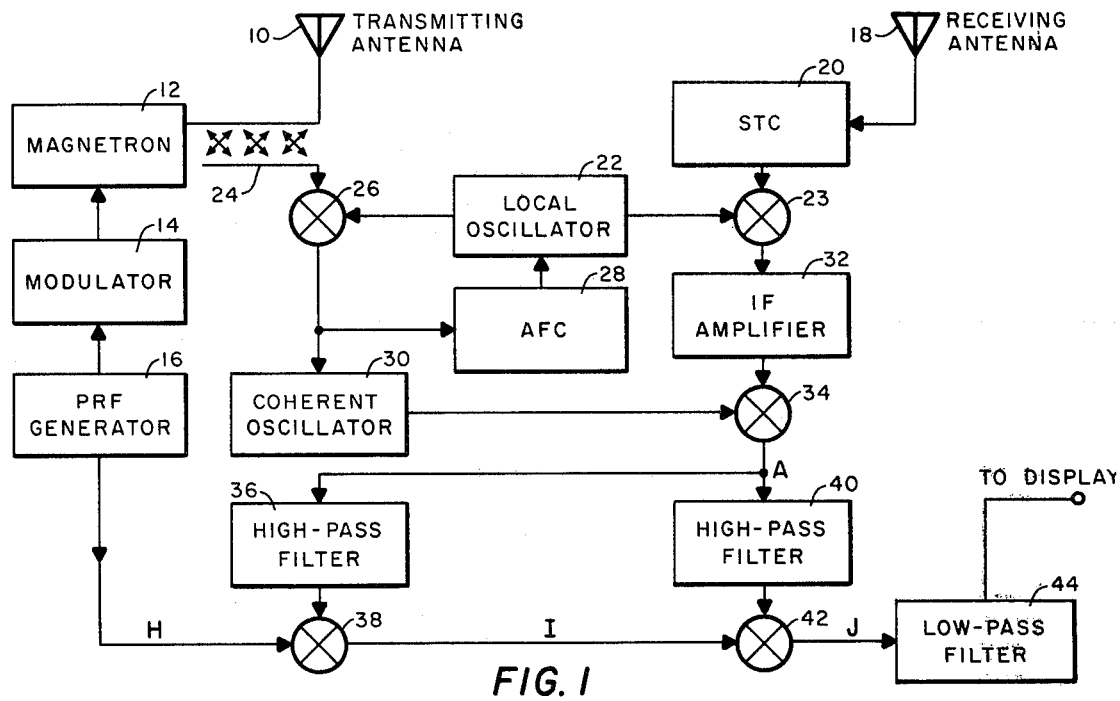
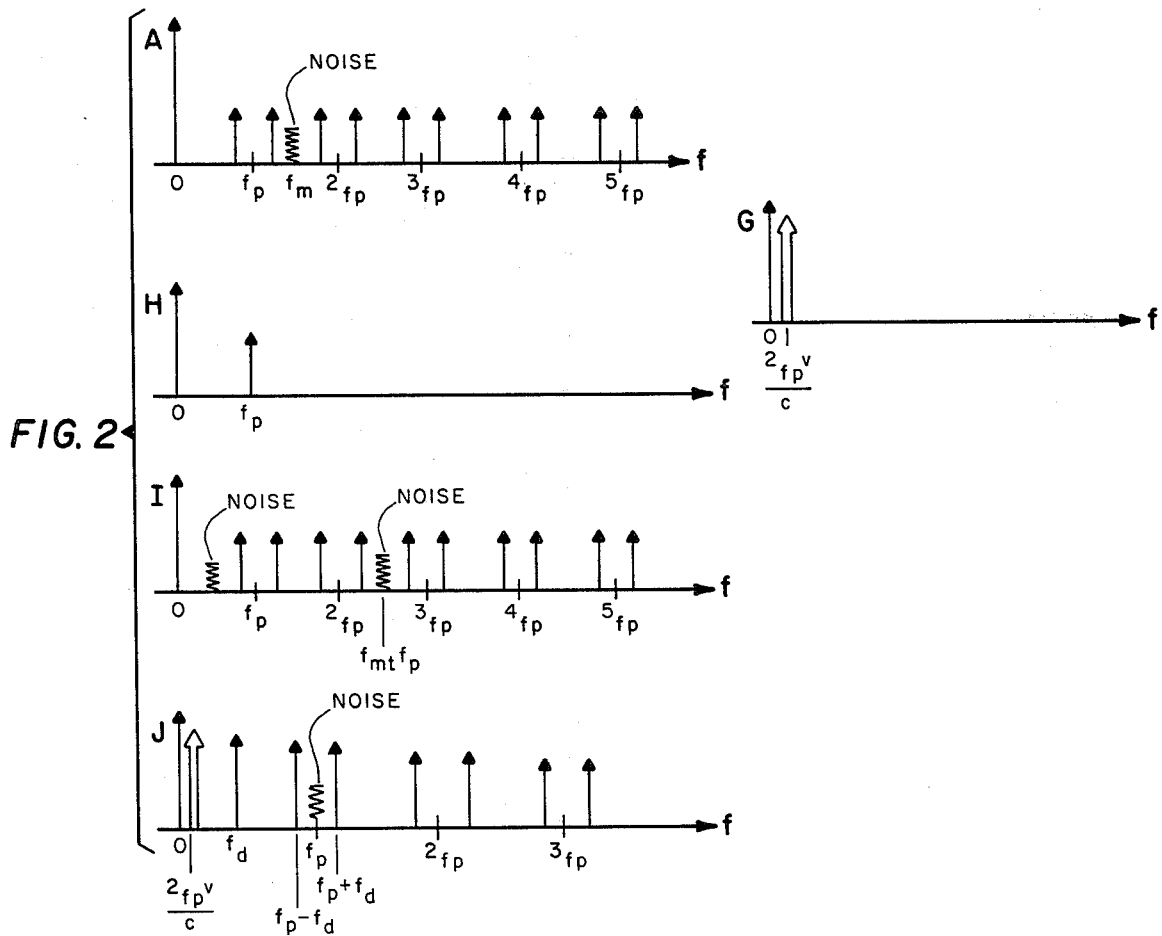

SELF ADAPTIVE CORRELATION RADAR

The invention herein described may be manufactured and used by or for the government of the United States of America for governmental purposes without the payment of any royalties thereon or therefor.

BACKGROUND OF THE INVENTION

The present invention relates to coherent correlation radar systems and more particularly to coherent correlation radar systems wherein the detection and correlation of the second order doppler is utilized.

In prior known practices the three most prevalent forms of coherent pulse systems are the homodyne delayed-local oscillator (DLO), the superheterodyne DLO, and the ZERO fuze systems. The homodyne DLO fuze processes the target-returned signal which is present about the fundamental harmonic at the output of the RF mixer. This signal is in the 1/f noise spectrum of the mixer crystals which limits the ultimate sensitivity of the system. In addition, the missile flight environment is capable of producing microphonics in this same frequency range presenting a possible prefunctioning condition. These shortcomings can be avoided by using superheterodyne techniques. However, all DLO systems have one characteristic that frequently poses a serious problem; viz., the need to delay internally a sample of the transmitted RF signal for an interval equivalent to the maximum range at which target detection is required. This delay is usually obtained with a length of coaxial cable, the volume and transmission loss of which may be excessive for any but the shortest range gates, especially at higher microwave frequencies.

The ZERO fuze system requires no RF delay line in its implementation, since target-return signals are sampled in temporal coincidence with the transmit pulse. However, for this reason, the ultimate sensitivity of the system is limited by the transmitted energy coupled into the receiver antenna system via the missile skin. An additional problem encountered in implementing th practical ZERO fuze is that of obtaining and maintaining the required stability.

The maximum fuzing range which can be obtained in both DLO and ZERO systems in which doppler processing is employed is limited by two conflicting requirements: (1) Since the maximum target doppler frequency must be sampled at least twice per cycle, there is a lower limit to permissible modulation rep-rate; and (2) Since the maximum range is inversely proportional to modulation rep-rate, there is also an effective upper limit.

The above described systems are also limited in range of operation by the sampling rate required by the target velocity and system operating frequency unless range and/or velocity ambiguities are tolerated. Narrow linear bandwidth can be obtained by either comb filter techniques which involve the complexity of a large bank of filters, or a system where a single filter is swept through the possible first order doppler spectrum at the expense of time.

SUMMARY

The present invention overcomes the deficiencies of the prior known systems by providing a means of shifting the doppler frequency spectrum by an amount equal to the pulse repetition frequency and correlating this shifted spectrum with the original doppler frequency signal to provide a target output signal. This permits the detection and utilization of the second order doppler and eliminates the requirement to sample the normal doppler signal or the first order doppler twice per doppler cycle. The present invention eliminates the requirement for a high pulse repetition rate and the consideration of target velocity and operating frequency which results in a coherent system free of range and velocity ambiguities with the detection range of the radar.

The clutter advantages of the disclosed system are enhanced by the wavelength of the second order doppler since the motion of trees, sea waves and storm fronts are negligible compared to the wavelength of the second order doppler. The linear continuous motion of a target can be processed exclusive of its background.

Target velocity and range information are still available by comparing the phase of the second order doppler with the phase of the reference pulse repetition frequency.

The present invention makes it possible to adapt the target signal to within the range of the final bandwidth without the use of an envelope signal and permits utilizing the theoretical limit of integration gain possible in a coherent system with square law detection.

The same principles which improve detection sensitivity of the doppler system also permits discrimination of jamming signals. If the magnetron is operated in a mode where pulse to pulse coherence does not exist, any type of ECM signal would be converted to broadband noise by the mixing effect of the coherent oscillator. The ECM energy is therefore distributed and produces a low spectral density which is filtered out.

Many of the attendant advantages of this invention will become readily appreciated as the same becomes better understood by reference to the following detailed description when considered in connection with the accompanying drawings wherein:

FIG. 1 is a block diagram of a doppler type radar embodying the invention.

FIG. 2 is a series of graphs used in explaining the operation of FIG. 1.

Referring now to FIG. 1 there is shown a standard moving target indicator radar having a transmitting antenna 10 for transmitting a pulse modulated radio frequency signal from magnetron 12 which is pulsed by the output from modulator 14 at a repetition frequency determined by the output of PRF generator 16. Reflected signals from a target (not shown) are received by receiving antenna 18 and fed through range gate and sensitivity time control (STC) 20 at the desired time which can be controlled by the output signal from PRF generator 16. The signal from STC 20 is fed to balanced mixer 23 where it is heterodyned with the output signal from local oscillator 22 to generate the incoming IF signal. The output signal from magnetron 12 is coupled through directional coupler 24 to balanced mixer 26 where it is combined with the output of local oscillator 22 to generate a reference IF signal. The reference IF signal out of mixer 26 is fed to automatic frequency control circuit (AFC) 28 to control the output frequency of local oscillator 22 and to coherent oscillator 30 for locking it in phase with the transmitted signals. The IF signal out of mixer 23 is amplified by IF amplifier 32 and fed to a balanced mixer 34 where it is added with the signal from coherent oscillator 30 to produce an output pulse train modulated by the doppler frequency. The output from mixer 34 is fed through high pass filter 36 to balanced mixer 38 and through high pass filter 40 to balanced mixer 42. Balanced mixer 38 combines the signal from high pass filter 36 with the signal from PRF generator 16 to produce an output signal which is the doppler signal out of mixer 34 but shifted by the amount of the PRF signal. The shifted doppler signal out of mixer 38 is combined in mixer 42 with the doppler signal out of mixer 34. The resultant output signal from mixer 42 is fed through a low pass filter 44 to the display apparatus (not shown).

In operation the signal at the output of mixer 34 (signal A, FIG. 2) has the form $$E_s = [E_R K] \frac{t_R}{T} \left[ 1 + 2 \sum_{n=0}^{\infty} \left( \frac{\sin \frac{n\pi t_r}{T}}{\frac{n\pi t_r}{T}} \right) \cos n\omega_p t \right] \cos \omega_d t$$

where $E_R$ represents the amplitude of the received target signal, K is a processing constant, $t_R$ is the received pulse width, T is the period of the repetition frequency, $\omega_p$ is the angular pulse repetition frequency and $\omega_d$ is the angular doppler frequency.

In balanced mixer 38 the spectrum A (FIG. 2) is mixed with the repetition frequency, $f_p$, (spectrum H, FIG. 2) which shifts spectrum A by the amount $f_p$ to provide spectrum I. Since the spectral lines of A are separated by $f_p$, spectrum I is identical in appearance with the original spectrum A.

The signal I (FIG. 2) from shift mixer 38 is mixed with the filtered signal A in mixer 42. Because of the harmonic relationship, $f_p$, between doppler sidebands, the output signal, J, has a major component at $$f_q = \frac{2f_p v}{c}.$$

Other components of signal J as a result of mixing are filtered out by means of a low pass filter 44 leaving signal G which is the $$f = \frac{2f_p v}{c}$$

component where v is the velocity of the target (not shown) and c is the speed of light. The width of filter 44 should be adjusted to meet the range of $f_q$ and the decision time of the system. The range of $f_q$ is a function of v and $\lambda_p$ (PRF wavelength) where $\lambda_p$ for a five mile radius is $$R_{max} = 2c/f_p \text{ and } f_p = c/\lambda_p$$

$$\lambda_p = R/2 = 13,200 \text{ ft.}$$

when $f_q$ is equal to;

$$f_q = \frac{2v_1}{\lambda_p}$$

The wavelength of this second order doppler for a mach ten target which would produce a second order doppler frequency of 1.53 Hz. The bandwidth of filter 44 is then determined by the decision time and not by target velocity or carrier frequency.

Obviously many modifications and variations of the present invention are possible in the light of the above teachings. It is therefore to be understood that within the scope of the appended claims the invention may be practiced otherwise than as specifically described.

What is claimed is:

1. A coherent correlation radar system comprising:
   (a) transmitting means for transmitting a pulse modulated radio frequency signal at a predetermined pulse repetition frequency,
   (b) receiving means for receiving signal echoes produced by the reflection of the transmitted signal from targets of interest,
   (c) correlation circuit means coupled to said transmitting means and to said receiving means for correlating the second order doppler sidebands of the received signal to produce an output target signal that is independent of the target velocity and the transmitted carrier frequency.

2. The radar system of claim 1 wherein said correlation circuit means includes:
   (a) a pulse repetition frequency generating means for generating an output signal to control the repetition frequency of the transmitted pulses,
   (b) a first mixer circuit coupled to said pulse repetition frequency generator and to said receiving means for producing an output signal with its spectrum being shifted with respect to the doppler signal out of said receiving means by the amount of the output frequency of said pulse repetition frequency generator,
   (c) a second mixer circuit coupled to said first mixer circuit and to said receiving means for producing an output signal which is the correlation of the second order doppler frequency.

* * * * *